United States Patent [19]

Ito et al.

[11] Patent Number: 4,581,665
[45] Date of Patent: Apr. 8, 1986

[54] MODE CHANGING MECHANISM FOR A TAPE PLAYER

[75] Inventors: Yukio Ito; Satoshi Takagi; Kazuki Takai, all of Tokyo, Japan

[73] Assignee: Clarion Co., Ltd., Tokyo, Japan

[21] Appl. No.: 378,696

[22] Filed: Jun. 17, 1982

[30] Foreign Application Priority Data

| May 20, 1981 | [JP] | Japan | 56-74891 |
| May 20, 1981 | [JP] | Japan | 56-74894 |
| May 21, 1981 | [JP] | Japan | 56-75669 |
| May 21, 1981 | [JP] | Japan | 56-75670 |
| May 22, 1981 | [JP] | Japan | 56-76722 |

[51] Int. Cl.$^4$ .................... G11B 15/44; G11B 15/26
[52] U.S. Cl. .................... 360/96.3; 360/74.1; 360/90; 360/137
[58] Field of Search .......... 360/73, 74.1, 74.2, 360/74.5, 88, 90, 93, 96.1, 96.2, 96.3, 137

[56] References Cited

U.S. PATENT DOCUMENTS

| 3,987,486 | 10/1976 | Ito et al. | 360/96 |
| 4,224,646 | 9/1980 | Schatteman | 360/96.3 |
| 4,225,894 | 9/1980 | Fulukawa et al. | 360/96.3 |
| 4,425,591 | 1/1984 | Ito et al. | 360/88 |

Primary Examiner—Stuart N. Hecker
Assistant Examiner—David J. Severin
Attorney, Agent, or Firm—Flynn, Thiel, Boutell & Tanis

[57] ABSTRACT

A tape recorder includes an intermittent gear which has a cut-off portion formed in part of the tooth system in order to release the intermittent gear as appropriate from being driven by a prime mover mechanism and which is integrally provided with a cam portion, an active member which is actuated by the above cam portion and operates directly or indirectly a control member which directly or indirectly controls the advancement and withdrawal of a tape driving mechanism comprising such components as a head, pinch roller and idler, and a changeover member which is adapted to change over the direction of tape feed and is operated by means of the above-mentioned active member.

9 Claims, 23 Drawing Figures

MODE CHANGING MECHANISM FOR A TAPE PLAYER

BACKGROUND OF THE INVENTION

1. Field of the Invention

The present invention relates to a tape recorder and, more particularly, to improvements in the channel change-over mechanism which controls the head, pinch roller, idler and other pressure-contacting driving mechanisms of the tape recorder auto-reverse system in order to offer a tape recorder of excellent operability.

2. Description of the Prior Art

Conventional tape recorders generally produce a tape driving state by operating a head, pinch roller and idler against a spring force when inserting a cassette and therefore have the disadvantage that initiation of the fast-forwarding, rewinding or ejecting operations requires significant force. Some tape recorders employ a mechanism for setting and resetting operations with a cam; however, the fast-forwarding and rewinding operations in this case also depend on the operating force of the operator, resulting in inferior operability. It has been suggested to conduct the head pressure-contacting operation, auto-reverse operation, etc. by means of an electromagnetic plunger; however, a strong operating force and large stroke are required for instantaneously operating an idler together with the head and pinch roller as above by using the plunger, and it is therefore unavoidable that the electromagnetic plunger itself is large in dimensions and that the electric circuit to control it is high in capacity, disadvantageously causing the tape recorder to be large in size and its manufacturing costs to be high.

SUMMARY OF THE INVENTION

An object of the present invention is to dissolve the inconvenience and drawbacks of the conventional tape recorders described above. According to the present invention, a cam portion is integrally formed on an intermittent gear which has a cut-off portion formed in a portion of its tooth system in order to selectively interrupt the drive provided by a prime mover mechanism such as a motor. An active member actuated by the above cam portion is provided to operate directly or indirectly the control member provided for direct or indirect control of the forward and backward motions of a tape driving mechanism which includes a head, pinch roller, idler, etc., and a changeover member for changing over the tape feeding direction is operated also by means of the above-mentioned active member. Stable and certain operation is successfully provided by means of the inventive arrangement, which is excellent in operability, light in weight, small in size and simple in construction.

BRIEF DESCRIPTION OF THE DRAWINGS

FIG. 8 (a), 8 (b) and 8 (c) are partial plan views showing the operating states of the tape player of FIG. 7, FIG. 8 (a) showing the system in a playback state, FIG. 8 (b) showing the system in a fast-forwarding or rewinding operation, and FIG. 8 (c) showing the system in the state of being released by the operation of a release lever;

DETAILED DESCRIPTION OF THE PREFERRED EMBODIMENTS

Figure 1:
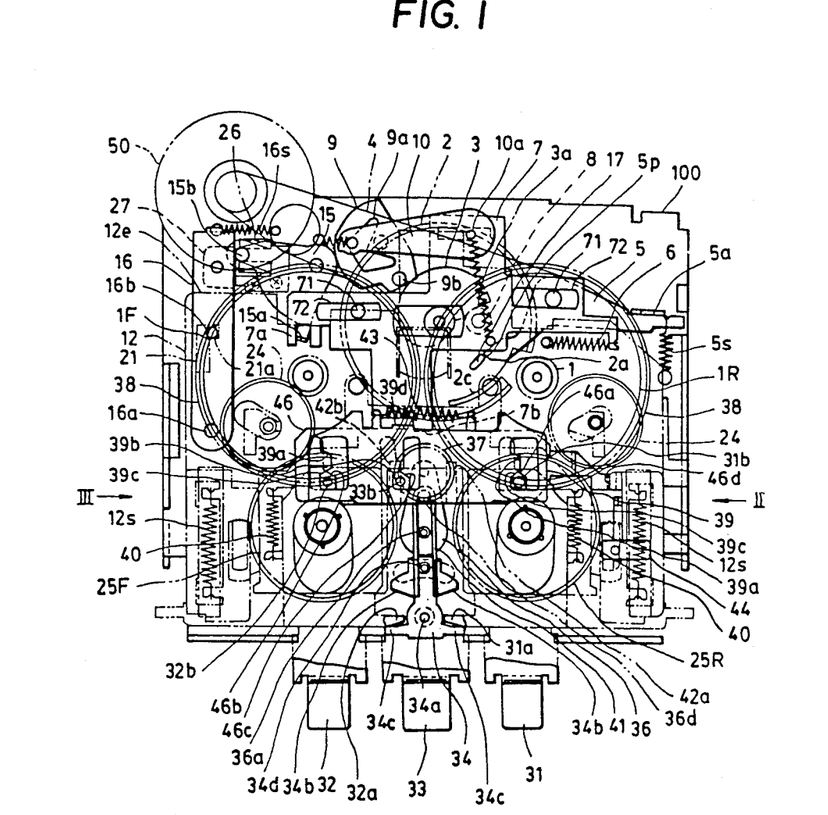
FIG. 1 is a plan view showing a tape player provided with a control mechanism according to the present invention.
Figure 2:
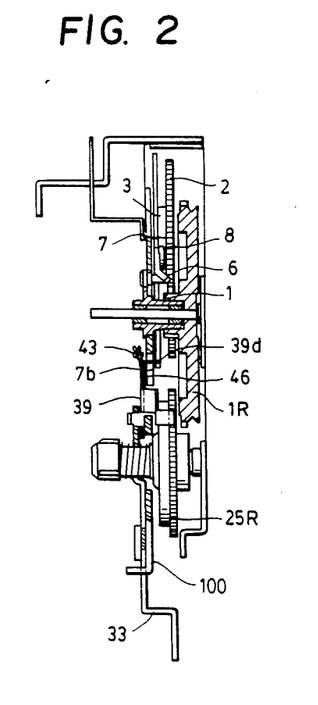
FIG. 2 is a sectional side-view of the tape player taken along the axial line of a flywheel and capstan.
Figure 3:
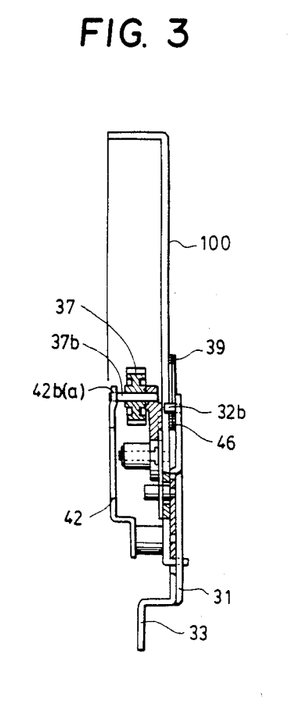
FIG. 3 is a sectional side-view of the tape player taken along the axis of an idler gear.

With reference to the accompanying drawings showing the preferred embodiments of the present invention, FIG. 1 shows a tape player with a control member 12 advanced to be in a play state. A belt 4 is driven by a motor 50 provided in a side recess of a deck 100, a flywheel 1F and a flywheel 1R driven by the belt 4 are installed at the bottom of the deck 100, a driving gear 1 is formed integrally with the flywheel 1R as shown in FIG. 2, the circumferential toothed portion of an intermittent gear 2 positioned between the flywheels 1R and 1F is situated so as to be engageable with the driving gear 1, an intermittent or cut off portion 2a of the toothed portion which can interrupt the engagement of the gear 2 with the above-mentioned driving gear 1 is formed on part of the gear 2, a cut-in or slot 2c parallel with the circumferential toothed portion is formed on one side of the gear 2 and communicates with the cut-in bottom portion of the intermittent portion 2a, and the toothed portion in the region where the cut-in 2c is formed is provided with appropriate elasticity for smoothing the action of engagement with the above-mentioned driving gear. A cam portion 3 is formed integrally with the intermittent gear 2, and an active member 7 is supported for movement parallel with the plate surface of the intermittent gear 2 with the gear 2 as a center. A spring 6 is provided between one end of the active member 7 and the deck, and the spring 6 allows the active member to slide leftward in FIG. 1 and gives the active member the energy for moving back. A roller, pin or similar cam follower piece 8 is provided on the lower face of the active member 7, the piece 8 is urged against the face of the aforementioned cam portion 3 by means of the force of the spring 6 acting on the active member 7 as mentioned above, and the active member 7 moves by following the face of the cam portion 3.

An engaging portion 15a of a rotating link 15 which is pivotally supported on the deck 100 is engaged with a stopping portion 7a formed on the tip of the above-mentioned active member 7, and a piece 15b provided at the other end of the rotating link 15 is touched to a receiving end 12e of a control member 12 which is in a moved-back state when the active member 7 starts moving leftward, so as to move the member 12 downward against the force of two resetting springs 12s. The control member 12 is provided with a stop hole 21 so that the control member 12 may be locked at its lower position by means of an engaging pin 16b provided in the middle of a locking member 16, the base end of which is pivotally supported at 16a on the deck 100.

The active member 7 mentioned above has guide holes 72 formed on both side portions as shown in the upper portion of FIG. 1, and pins 71 provided on the deck 100 are engaged with the guide holes 72, respectively. A locking member 5 has its middle portion revolvably supported by one of the pins 71 and is provided with a turning effort in the clockwise direction in FIG. 1 by means of a spring 5s at one end. The aforementioned intermittent gear 2 is provided with a projection 17, and the active end 5p of the locking member 5 is movable to a position engaging the projection 17, that is, the projection 17 is formed at a position corresponding to the above-mentioned intermittent portion 2a. In a non-active state as shown in FIG. 1 in which the above-mentioned driving gear 1 is positioned in the intermittent portion 2a, the aforementioned piece 8 is in touch with a stepped portion 3a of the cam 3 and is giving a turning effort so as to urge the intermittent gear 2 to rotate in the counterclockwise direction, and the turning is prevented by the active end 5p of the locking member 5 engaging with the aforementioned projection 17.

As described before, the control member 12 is advanced downward by the rotating link 15 in response to leftward motion of the active member 7, and the control locking member 16 locks the stop portion 21 of the control member 12. The control locking member 16 is provided to be rotatable about the fulcrum 16a, and its moving end is provided with a core 27 of a holding plunger 26 and is energized in the holding direction by means of a spring 16s which is too weak to keep the spring 12s from moving the control member 12 upwardly. As the control member 12 advances and the stop portion 21 of the engaging pin 16 reaches the bent portion 21a, the energizing force of the spring 16s causes the control locking member 16 to act in the locking direction for having the core 27 touch the holding plunger 26 and be held by the holding plunger 26 which is in a state of being supplied with electric power. When the electric power supply to the holding plunger is turned off, the lock of the control member 12 is released because the core 27 is unable to be held by the force of the spring 16; therefore, the control member moves back it its upper position.

The above-mentioned flywheel 1R and the other flywheel 1F provided opposite to the flywheel 1R rotate in directions opposite to each other as may be seen from the placement of the belt 4 from the motor pulley shown in FIG. 1. These flywheels 1R and 1F are associated with a first reel base 25R and second reel base 25F, respectively. Between these reel bases 25R and 25F is a gear idler 37 provided on the free-end side of an interlocking member 36, and the operation of the interlocking member 36 causes the idler 37 to be simultaneously engaged with the circumferential gear portion 38 of a selected flywheel 1R and 1F and the circumferential gear of a respective reel base 25R and 25F, whereby a fast-forwarding or rewinding operation is effected. The engagement of the idler 37 with the flywheel and engagement with the reel base take place with some time difference between them; therefore, the engagement with the circumferential gear portion 38 of flywheel precedes with priority, and the engagement with the reel base gear portion follows thereafter. By this means, the idler 37 first rotates, and the reel base is positively driven as the engagement with the reel base which is at a stop takes place because the idler is rotating. This prevents a rotation disabled state from being produced between the gear tips of the idler 37 and reel base. Two operation levers 31 and 32 for conducting fast forwarding and rewinding (each of the operation levers working either for fast forwarding or rewinding depending on the tape movement direction and having as its identification marking an arrow or similar symbol simply denoting the direction of tape movement are provided on both sides of a release lever 33 on the front of the deck 100. These fast-forwarding and rewinding levers 31 and 32 are each provided with a spring 40, and are normally energized in the releasing direction (downward). Each of the operation levers 31 and 32 is provided with an operating portion 31a or 32a, and an idler control member 34 is rotatably supported on a pivot 34a between the operating portions 31a and 32a. The member 34 is provided with receiving portions 34b and 34b and receiving portions 34c and 34c on the depth and surface sides, respectively, which cooperate with the above-mentioned operating portions 31a and 32a. As either one of the operation levers 31 and 32 is depressed, it acts on one of the receiving portions 34b and tilts the member 34. The returning motion of the depressed operation lever acts on one of the receiving portions 34c to return and restrict the member 34 to the illustrated neutral state. A U-shaped resilient member 41 is provided between the member 34 and aforementioned interlocking member 36. The member 41 is fitted over a projection 34d provided on the tip side of the member 34, a pivot 36a of the interlocking member 36 and a projection 36d provided on the tip side of the interlocking member 36. When the member 34 pivots the interlocking member 36 symmetrically tilts and returns, and the tile angle of the interlocking member 36 is limited by the stop claws 42 and 42b provided on both sides of the interlocking member thereby optimizing the engagement of the above-mentioned idler gear 37 with the flywheels and reel bases. These stop claws 42a and 42b are bent to be appropriately adjusted so as to make the limiting condition suitable. The member 41 provides a suitable cushion effect at the time when the idler gear 37 engages with the gear portions of a flywheel and reel base, preventing the gear tooth tips from being possibly damaged in case the gear and the gear portions engage each other as rigid bodies, suppressing the vibration due to the rotating operation, and letting the gear and the gear portions engage each other with an active force overcoming the repulsion at the time when the rotating gears mutually engage each other. At the time of their disengagement, the member 41 causes the interlocking member 36 to return to the intermediate position as being interlocked with the oscillating member 34.

The aforementioned fast-forwarding and rewinding operation levers 31 and 32 are provided with pin- or roller-shaped engaging portions 31b and 32b in their respective tip portions, and these engaging portions 31b and 32b are opposite to locking portions 39a and 39a, respectively, of a movable control locking member 39. When either operation lever is depressed, the engaging portion is locked by the associated locking portion for holding the fast-forwarding or rewinding state. The control locking member 39 of the operation levers 31 and 32 is provided with a release cam portion 39b which touches an engaging portion 33b disposed at the tip portion of the release lever 33 provided between the operation levers 31 and 32, and the operation levers 31 and 32 are released from the locked state by depressing the release lever 33. On the lower side of the aforementioned locking portions 39a and 39a, a respective release cam portion 39c is formed; therefore, in case either one of the operation levers 31 and 32 is operated while the other in in the locked state, the engaging portion (31b or 32b) of the operated lever first acts on the release cam portion 39c to release the other lever from the locked state, and locks itself thereafter.

A sensing member 46 is provided adjacent the control locking member 39 for directly or indirectly releasing the control member 12 from pressure-contacting, and is provided with contacting portions 46a, 46b and 46c corresponding to the engaging portions 31b, 32b and 33b of the aforementioned levers 31 to 33. On one side of the sensing member 46, an operating portion 46d is formed to correspond to a switch 44, and a spring 43 is provided between the sensing member 46 and control locking member 39. The switch 44 controls the plunger 26 which is provided for locking the control member 16 which controls the muting of sound pressure and the pressure-contacting release of the head, pinch roller, idler, etc. In a modified embodiment (FIG. 7), the sensing member 46 does not effect the lock-holding of control member by means of the plunger 26, etc., and direct locking of the control member 12 is provided, the aforementioned contact-pressure release of the head, pinch roller and idler being effected by letting the sensing member 46 be actuated by such operations as fast-forwarding, rewinding, stop, eject, etc. In this case, part of the sensing member 46 is provided with an engaging portion 46e as separately shown in FIGS. 7 and 8 (a) to (c), and a stopping portion 12a is formed on the control member 12, so that the engaging portion 46e may lock the stopping portion 12a at the position to which the control member 12 has advanced.

On the lower side of the aforementioned active member 7, an active portion 7b (FIG. 1) is provided. The active portion 7b is opposed to a projection 39d of the control locking member 39, and when the locking of the projection 17 of the previously described intermittent gear 2 by the locking member 5 is released, and the active member 7 causes the driving gear 1 to be engaged by and drive the intermittent gear 2, the projection 39d and active portion 7b touch each other to assist the force which is provided by the spring 6 of the active member 7 so as to move the control locking member 39 to a release position against the force which is provided by the aforementioned spring 43.

Release of the locking member 5 is done by letting a plunger (not illustrated) which is actuated by means of a tape end, cassette pack insertion or program changeover act on an operating portion 5a formed at a position near the spring 5s as shown in FIG. 1, etc. In not-illustrated alternative embodiments the member 5 can be released by letting a program changeover lever which operates against the tensile strength of the spring 5s act on the operating portion 5a; or by letting an eccentric cam provided on the reel base act on a sensing lever and by providing an active force from an active piece via frictional force due to revolution of the reel base in a direction opposite to that of the active force produced by the above-mentioned eccentric cam so that a mechanical detection mechanism, which causes the sensing lever to slide in the axial direction by letting a stepped portion formed on the eccentric cam stop at the engaging portion of the sensing lever when the active force due to the active piece ceases, may act on the operating portion 5a; or by using as appropriate such a detecting means as utilizes the tape tension.

Locking of the control member 12 by means of the aforementioned control locking member 16 and its release may alternatively be provided not by using the control locking member 16 but by providing the control member 12 with a core corresponding to a magnetically attractive plunger provided on the deck for letting the attractive plunger lock the control member 12 in the state of having been advanced by the action of the rotating link 15, and releasing this locking by having the electric power supply to the plunger turned off.

Figure 9:
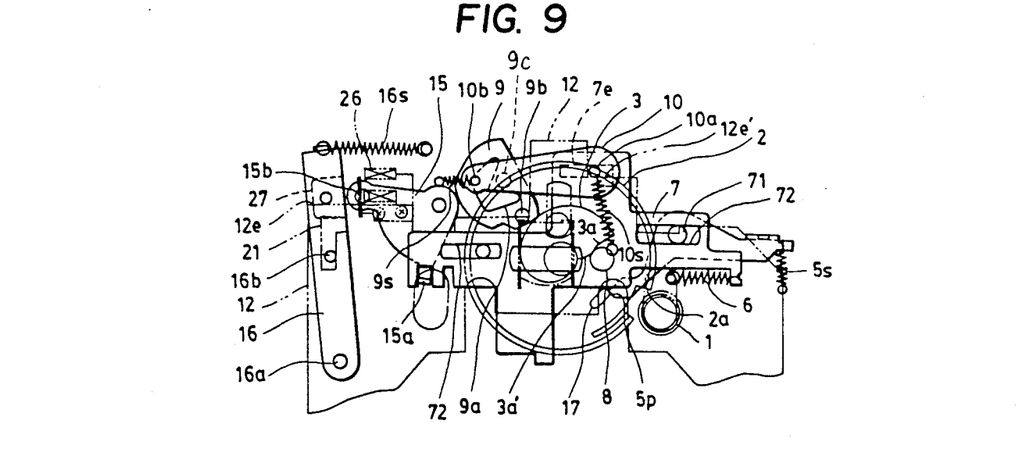
FIGS. 9 to 12 are fragmentary plan views of the tape player of FIG. 1 showing the state of a control member being actuated by an active member of the system, respectively.
Figure 10:
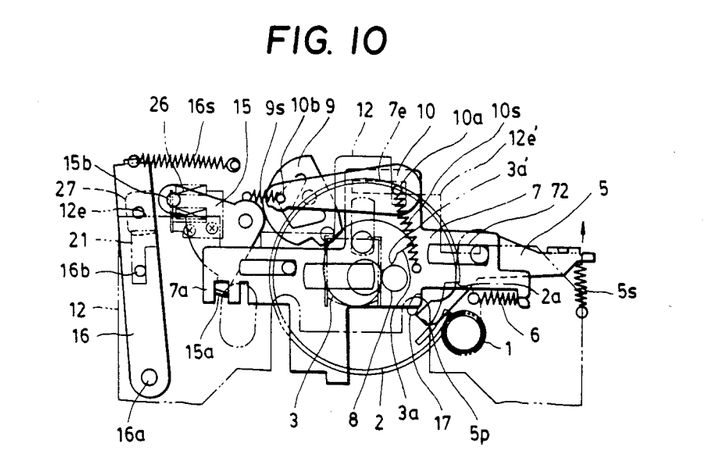

The embodiment according to the present invention as described above operates as will now be described. When as shown in FIG. 9, the active end 5p of the locking member 5 is engaging the projection 17 of the intermittent gear 2, if the locking member 5 is actuated to move the operating portion 5a against the action of the spring 5s by insertion of a cassette, detection of a tape end or operation for program changeover, the engagement of the active end 5P and projection 17 is released. As this release causes the active force due to the spring 6 to act on the stepped 3a of the cam portion 3 through the piece 8 of the active member 7, the intermittent gear 2 is caused to rotate a little in the counterclockwise direction in FIG. 9, and the piece 8 of the active member 7 thus drops to the deepest (radially inner-most) portion of the cam portion 3. In the course of the piece 8 being dropped in to the deepest portion of the cam portion 3, since the section extending from the intermediate portion of the stepped portion 3a to the deepest portion of the cam portion 3 is formed as an arc-shaped portion 3a' as shown in the illustration, even when the cam portion 3 rotates in the counterclockwise direction from the state shown in FIG. 9, the pushing pressure (due to the spring 6) of the piece 8 acting in the horizontal direction in the illustration acts approximately evenly (whereas the rotation of the cam portion 3 causes the rotation-directional active force of the piece 8 pushing the cam portion to decrease rapidly in case of the stepped portion 3a being flat), infallibly producing the state shown in FIG. 10. As the cam portion 3 and intermittent gear 2 are thus rotated a little in the counterclockwise direction, the teeth near the cut-in 2c of the intermittent gear 2 become engaged with the driving gear 1. As the driving gear 1 is rotated by such a prime mover as a motor, the intermittent gear 2 is rotated, and the cam portion 3 rotates therewith; therefore, the pin 10a of the cam changeover member 10 reaches the bent corner portion of a j-shaped engaging hole or slot 7e formed in the top portion of the active member 7. During the states shown in FIGS. 9 and 10, the stepped portion of the edge 12e of the control member 12 is covering the bent portion of the engaging hole 7e, and the pin 10a is, therefore, not dropped into the bent portion even by the action of the spring 10s. In other words, when the active member 7 moves while the control member 12 is in the moved-back state as shown in FIGS. 9 or 10, the cam changeover member 10 is not moved by the active member 7. In the course of the state shown in FIG. 9 becoming that shown in FIG. 10, the piece 15b of the rotary link 15 connected to the active member 7 assumes the state of being separated from the receiving edge 12e of the control member 12; therefore, the control member 12 will not be actuated until the active member 7 is thereafter caused by the cam portion 3 to move a little rightwardly (in the direction opposite to the direction the active member 7 moves as the piece 8 drops to the deepest portion of the cam portion 3), and the piece 15b touches the receiving edge 12e again. In other words, the advancing action of the control member 12 lags a little behind the start of rightward movement of the active member 7.

Figure 11:
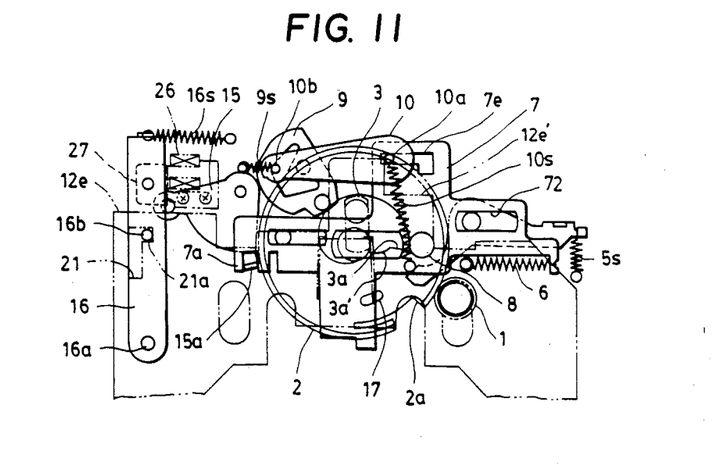
Figure 12:
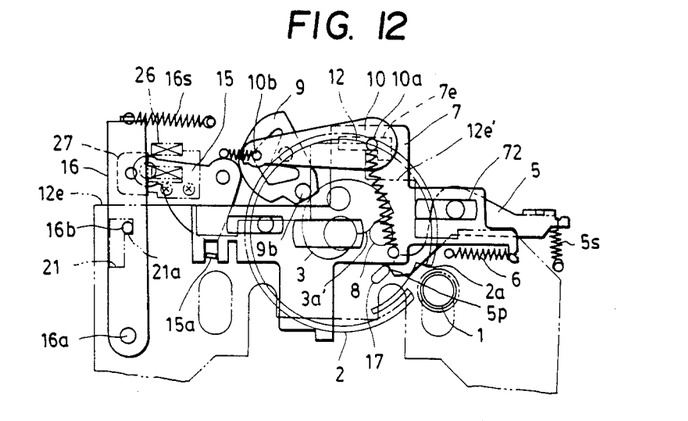
Figure 13:
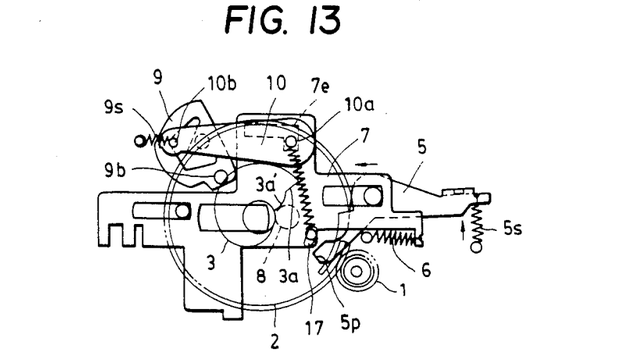
FIGS. 13 to 17 are fragmentary plan views of the tape player of FIG. 1 showing the relative actions of a changeover cam and cam changeover member for changing over the tape feeding direction under control of the active member, FIGS. 13 to 15 showing one of the tape feed direction changeover operations, and FIGS. 16 and 17 showing the other tape feed direction operation.
Figure 14:
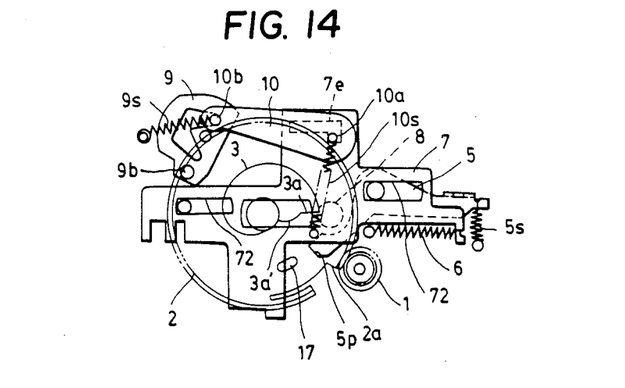
Figure 15:
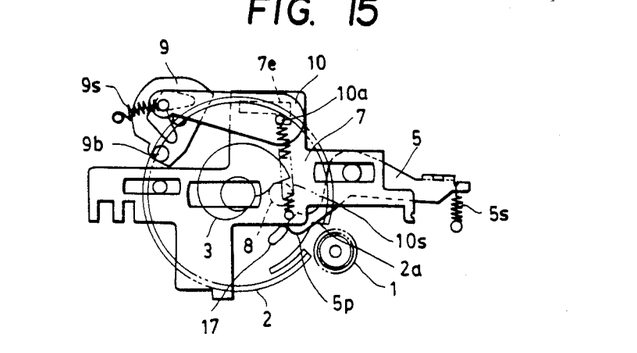

The control member 12 is is advanced by the rotary link 15 by means of rightward movement of the active member 7, and the pin 16 of the locking member 16b engages with the bent portion 21a of the stopping hole 21 to cause member 12 to be locked as shown in FIG. 11, producing the play state as shown in FIG. 12. While the control member 12 is in the advanced, or play, state, its stepped portion of the upper edge 12e is spaced from the engaging hole 7e as shown in FIG. 12. If a release operation similar to that described above is given to the locking member 5 in this condition, the intermittent gear 2 rotates by being engaged with the driving gear 1 in the same manner as described before. In this case, however, the active member 7, from the state where the piece 8 engages the middle of the stepped portion 3a of the cam portion 3 as shown in FIG. 9, is first slid temporarily in the direction shown with an arrow in FIG. 13 by the stability of the spring 6 to let the piece 8 be dropped in to the deepest portion of the cam face from the intermediate position of the stepped portion 3a; therefore, the pin 10a having been at a stop in the state as shown in FIG. 9 is dropped into the bent portion of the engaging hole 7e by the action of the spring 10s as shown in FIG. 13. In other words, the cam changeover member 10 is first engaged and locked with the active member 7. When the intermittent gear 2 and cam portion 3 are rotated with the cam changeover member 10 engaged and locked with the active member 7 as above (for the play state), the active member 7 is caused by the cam face of the cam portion 3 to be slid in the direction opposite to the direction of the arrow shown in FIG. 13. Therefore, the cam changeover member 10 is simultaneously moved and a pin 10b thereof acts on a V-shaped angle cam 9a of a changeover cam 9 for operating the changeover cam 9 for the reverse changeover from the state shown in FIG. 13 to that shown in FIG. 14. Thereafter, the engagement of the driving gear 1 and intermittent gear 2 is interrupted by cut-off 2a and the piece 8 again engages the middle of the stepped portion 3a as shown in FIG. 15. As the intermittent gear 2 is further rotated from the state shown in FIG. 15, the changeover cam 9 is changed over by being rotated in the direction opposite to that in case of FIG. 14 from the state shown in FIG. 15 to that shown in FIG. 16, and again the engagement of the driving gear 1 and intermittent gear 2 is interrupted with the piece 8 in touch with the middle of the stepped portion 3a as shown in FIG. 17, and the operation stops. Thereafter, by each revolution of the intermittent gear 2, the changeover cam is alternately changed over in the clockwise and counterclockwise directions. As shown in FIG. 9 and thereafter, the changeover cam 9 is provided on the deck 100 to be rotatable by means of a pivot 9c, and a spring 9s is provided between the pin 10b of the cam changeover member 10 and the deck 100. The changeover cam 9 reverses the direction of tape movement according to a known technique. Although the changeover plate is not illustrated, the cam portions to change over the pinch rollers (not illustrated) provided on both sides of the head and the intermediate idler 24 to be engaged and disengaged between the driving gears 1 and reel bases 25R and 25F are formed so that the continuous tape feed according to an auto-reverse system can be realized by the aforementioned reverse changeover operation of the changeover cam 9 as shown in FIGS. 13 to 17, whereby a preferable tape recorder function is provided.

The control member 12 is provided for directly or indirectly effecting pressure-contacting release and control operation regarding the tape transport mechanism which includes the head, idler, pinch roller, etc.

Figure 16:
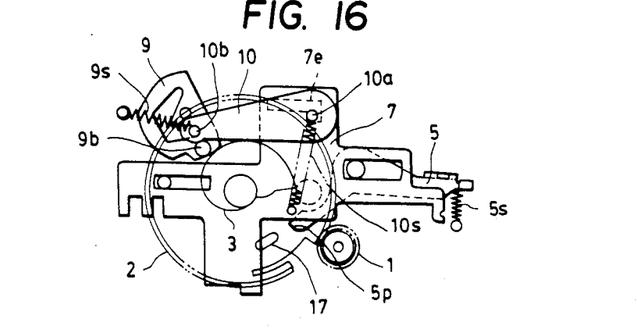
Figure 17:
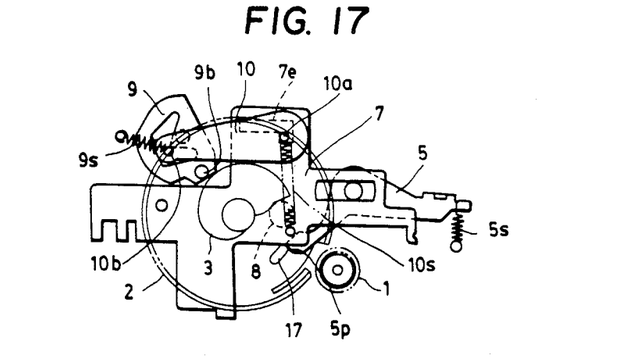

By dividing the cam portion 3 into two parts, especially by utilizing an intermediate stepped portion 3a' (FIG. 9) in the non-active state when the intermittent gear 2 and driving gear 1 are disengaged from each other, the action stroke of the active member 7 from the state as in FIG. 16 to the final state as in FIG. 13 through the state as in FIG. 17 is effected in a positive and orderly manner. By using one of the two parts for operating the head, pinch roller, idler and other pressure-contacting and for the auto-reverse mechanism operation as mentioned above, and by using the other part for initiating rotation, of the intermittent gear 2 as well as effecting the connection with the channel changeover mechanism connecting member and the lock release of the fast-forwarding or rewinding operation lever, the changeover from the fast-forwarding or rewinding state to the playback state can be effected in a positive and orderly manner with one revolution of the intermittent gear. This is similarly applicable to the combination of channel changeover and head pressure-contacting.

Figure 4:
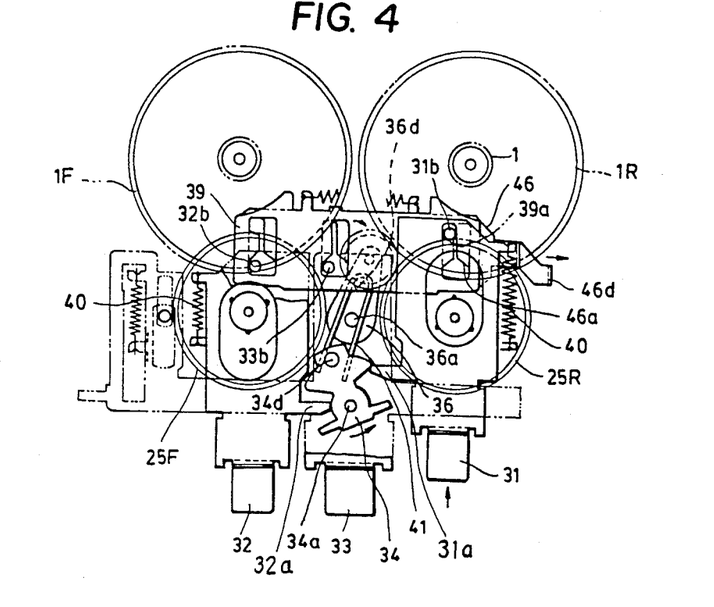
FIG. 4 is a fragmentary plan view showing the tape player in a fast-forwarding or rewinding state.

The operation of the preferred embodiment as described above will further be explained. As the aforementioned operation lever 31 is pushed in as shown in FIG. 4, its operating portion 31a causes the member 34 to rotate in the counterclockwise direction in FIG. 1, which causes the interlocking member 36 to be rotated clockwise via the resilient member 41. Then, the idler gear 37 is engaged with the gear 38 of the flywheel 1R and the gear portion of the reel base 25R for thereby driving the reel base 25R. On the other hand, the operation lever 31 is locked to the locking portion 39a of the control locking member 39 and is thereby held in the pushed-in state. Further, by means of the operation lever 31, the touching portion 46a of the sensing member 46 is pushed to let the operating portion 46d actuate a switch 44. The switch 44 is provided in the circuit to supply electric power to the plunger 26 provided for holding in an active state the control member which is provided for holding the mechanism of head, pinch roller, idler, etc. in the pressure-contacting state needed for playback, and the aforementioned actuation of the switch 44 causes the power supply circuit to be turned off to discontinue the power supply to the plunger 26 for thereby letting the above-mentioned playback mechanism move back from the playback state. What is described above is similarly applicable to the case in which the operation lever 32 is pushed in, with the exception of the tilting direction being reversed regarding the member 34 and interlocking member 36 and the pressure-touching direction of the idler gear 37 being reversed. In other words, the idler 37 is engaged with the gear 38 of the flywheel 1F and the gear of the reel base 25F for thereby driving the reel base 25F, and the operation lever 32 that is pushed in is locked to the locking portion 39a on the left side in the illustration.

Figure 7:
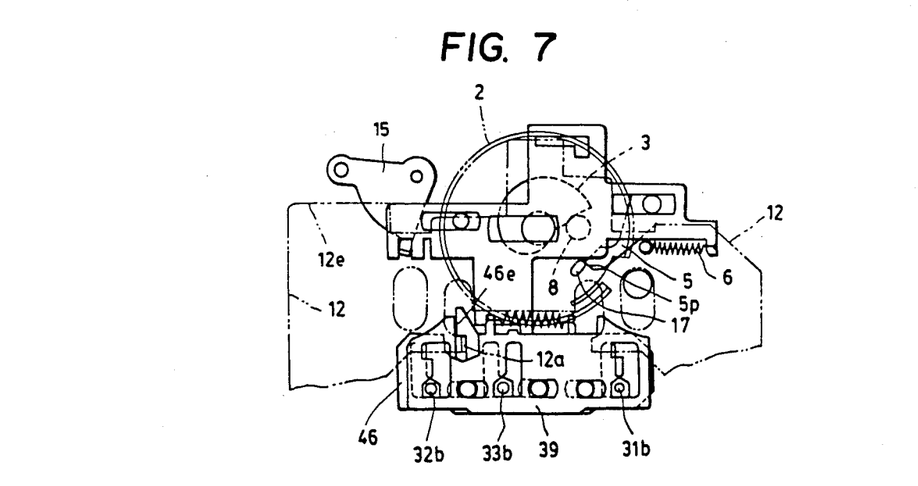
FIG. 7 is a fragmentary plan view showing the playback state of an alternate embodiment of the tape player in which a control member is locked directly by a sensing member.
Figure 8A:
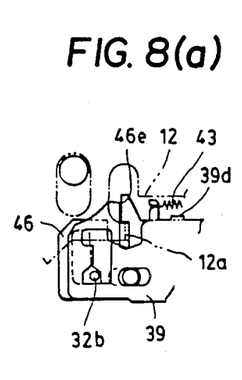
Figures 8B, 8C:
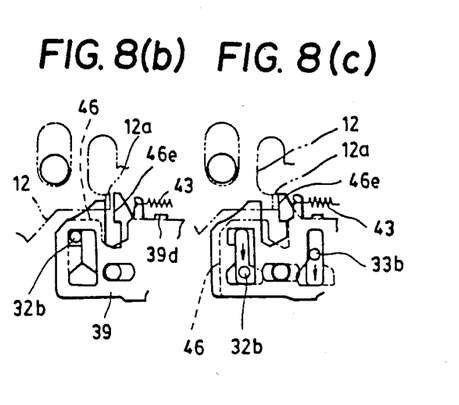

In case of the embodiment (FIG. 7) in which locking of the control member 12 is done directly by means of a sensing member 46 as shown in FIG. 7, when the operation lever 31 or 32 is operated during the playback state as in FIG. 7, the engaging portion 46e is released from the locked state as in FIG. 8 (a) to the unlocked state as in FIG. 8 (b) to let the control member 12 move back, and the operation lever 31 or 32 is locked by the corresponding locking portion 39a as shown in FIG. 1 for the locking member 39.

Figure 5:
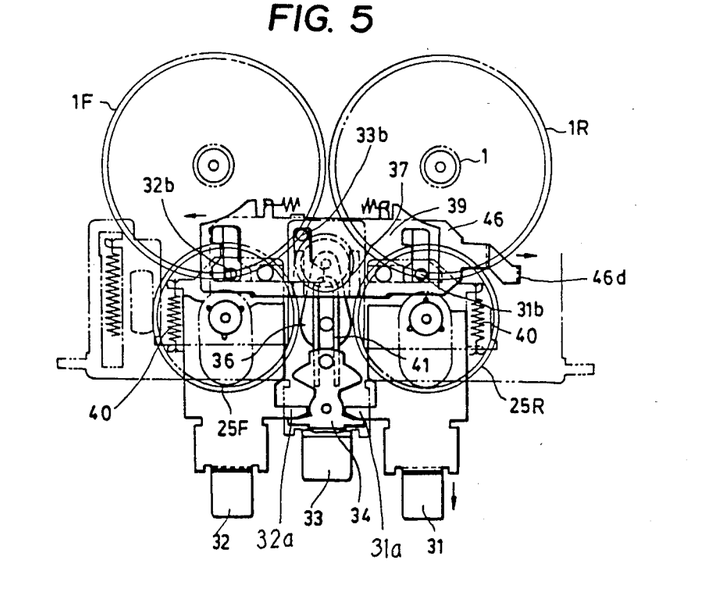
FIG. 5 is a fragmentary plan view showing the tape player in the state of being released by means of a release lever.

The operation lever 31 or 32 which is locked as described above is released from the locked state by pushing in the release lever 33 as shown in FIG. 5. That is, as the release lever 33 is pushed in during the state in which the operation lever 31 or 32 is locked by the corresponding locking portion 39a as decribed above, the engaging portion 33b of the release lever 33 engages with the release cam portion 39b of the control locking member 39 and slides the control locking member 39 leftward in the illustration; therefore, the operation lever 31 or 32 is released from being locked by the corresponding locking portion 39a. In case that either one of the operation levers 31 and 32 is pushed in while the other operation lever (32 or 31) is in the locked state, the locked operation lever is first unlocked in the same manner as described above.

Figure 6:
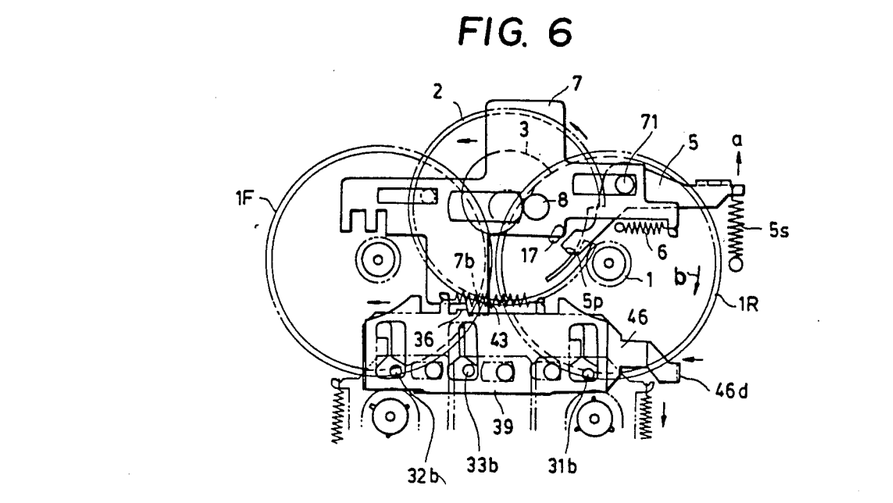
FIG. 6 is a fragmentary plan view showing the tape player in the state of being released as a cam rotates because of tape-end detection or some other cause.

By the tape end detection (such an operation as the mechanical action cue to a mechanical detection of the condition of tape tension upon arrival of a tape end or the action of an electromagnetic plunger upon detection of the stop of reel base rotation at a tape end by means of a detector circuit) in the fast-forwarding or rewinding state, the aforementioned locking member 5 is rotated about a pin 71 as shown with an arrow "a" in FIG. 6 against the active force of the spring 5s, the engagement of the projection 17 and active edge 5p is released to let the intermittent gear rotate, the intermittent gear 2 and driving gear 1 engage each other as in FIG. 6 to cause the intermittent gear 2 to be rotated by the revolution of the flywheel 1R which rotates as shown with an arrow "b" in FIG. 6, the active portion 7b of the active member 7 acts on the projection 39d of the control locking member 39 for thereby sliding the control locking member 39 leftward, and the operation lever 31 or 32 that has been locked is released from the locked state as in FIG. 6. Simultaneously with these actions, the sensing member 46 is reset to place the control member, which is provided for holding the head, pinch roller, etc. in the playback state, in the release state. Further, as the intermittent gear 2 rotates, the above-mentioned control member is advanced to move the head, pinch roller, idler, etc. to the playback state.

By dividing the action stroke of the active member 7, due to the aforementioned cam 3 which is integrally provided with the intermittent gear 2, into two parts separated by the non-active state in which the intermittent gear 2 and driving gear 1 are disengaged from each other, by offering one of the two parts for the pressure-contacting operation of the above-mentioned head, pinch roller, idler, etc. and for operation an auto-reverse changeover mechanism, and by offering the other part for initiating rotation of the intermittent gear 2 as well as for effecting the connection with a channel changeover mechanism connecting member and the lock release of the fast-forwarding or rewinding operation lever, the changeover from the fast-forwarding or rewinding state to the playback state can be effected in a positive and orderly manner with one revolution of the intermittent gear. This can similarly be done regarding the combination of channel changeover and head pressure-contacting as well.

Figure 21:
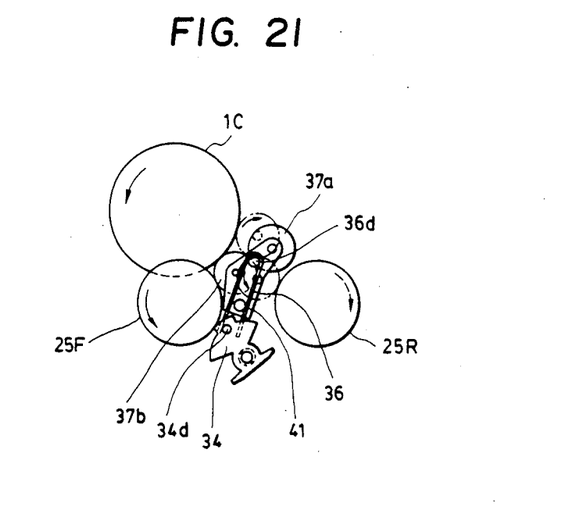
FIG. 21 is a fragmentary plan view showing a modified embodiment of the changeover mechanism which couples the reel bases and flywheel.

According to the present invention, regarding the changeover of the idler 37 between the reel bases 25F and 25R, an embodiment (FIG. 21) can be provided by using two idlers 37a and 37b which touch each other as shown in FIG. 21 and by using one flywheel 1C. By providing the changeover operations as shown with the solid and broken lines in FIG. 21, the turning effort from the single flywheel 1C can be transmitted to the reel base 25F or 25R by means of the idler 37b alone in case of the solid line and by means of both idlers 37a and 37b in case of the broken line.

Figure 18:
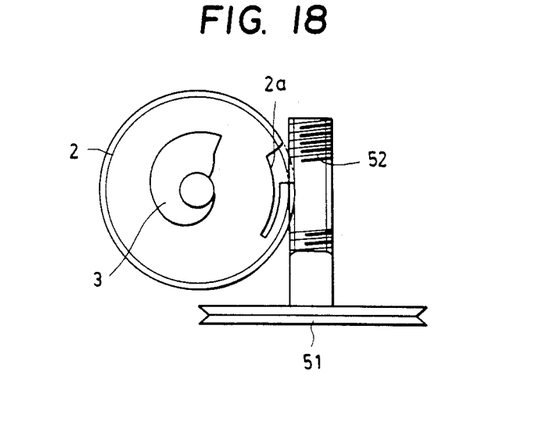
FIG. 18 is a fragmentary plan view showing a modified embodiment of an intermittent gear driving system.
Figure 19:
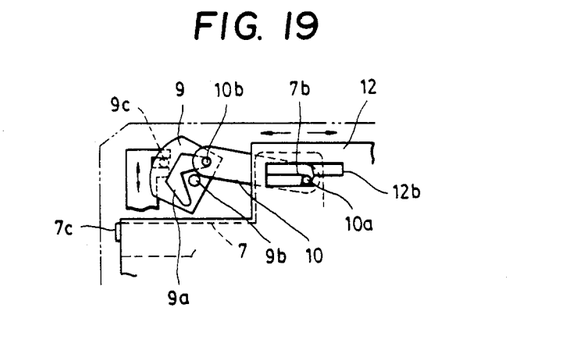
FIG. 19 is a fragmentary plan view showing a modified embodiment of a mechanism which causes an active member to act on the control member.
Figure 20:
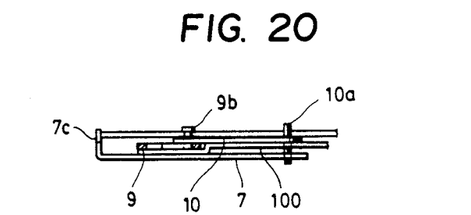
FIG. 20 is a side-view showing the embodiment of FIG. 19.

In the case of the preferred embodiment described above, drive of the intermittent gear is provided by means of the driving gear which is provided integrally with the flywheel; however, the drive of the intermittent gear 2 may alternatively be provided by using as appropriate a pulley as shown in FIG. 18. By forming a worm 52 coaxially with the pulley 51 to be driven by a motor 50 as described before and by orienting the intermittent gear 2 relative to the worm 52 as shown in FIG. 18, an action similar to that described previously can be provided while the structure other then the above remains similar to that described before. By using the worm 52 as above, smaller dimensions and a higher reduction ratio can be provided. Also, the actuation of the control member 12 by means of the active member 7 may be provided as shown in FIGS. 19 and 20, without using the link 15. By omitting the rotary link 15 shown in FIGS. 1 or 7, providing the active member 7 with a projection 7c for letting it directly push the end portion of the control member 12, forming a separating opening 12b in the control member 12 and a J-shaped hole 7b in the active member 7, letting these engage with the pin 10a of the cam changeover member 10 and letting the pin 10b of the cam changeover member 10 engage with the changeover cam hole 9a in the cam body 9, the cam body 9 is rotated.

In the case of the above-explained embodiment according to the present invention, because the cam portion is integrally formed with the intermittent gear having a cut-off portion formed in part of the gear train in order to release the driving state as appropriate, and because the active member to be actuated by the cam portion is permitted to operate the control member which is provided for the advancement and withdrawal of the tape driving mechanism which includes the head, pinch roller, idler, etc., it is apparent that the tape feeding state can automatically be formed or release at the time of cassette insertion or ejection. Further by forming and holding the above-mentioned tape feeding state through rotation of the intermittent gear and cam portion due to the aforementioned driving mechanism under the condition that the aforementioned control member is normally energized in a releasing direction, releasing the holding condition is merely needed at the time of fast-forwarding, rewinding or ejection; therefore, the operating force can be alleviated to a great extent. As the aforementioned prime mover, a rotary driving mechanism like the motor for play use is utilized; therefore, no electromagnetic plunger of high output and high capacity is needed, the mechanical construction is simplified, and, since the rotation of the intermittent gear and cam portion can be provided with a relatively small active force, direct operation with such a simple mechanical means as a tape and detecting mechanism or tape tension mechanism can be applied. Even in case of utilizing a plunger, a large plunger as is conventional is unnecessary, and the plunger control circuit merely needs to be a low-capacity one; therefore, small dimensions and low manufacturing costs will result. Since the driving mechanism due to the intermittent gear, its cam portion and active member is utilized also for driving the auto-reverse changeover mechanism, and its operative connection is controlled in relation to the advancement and withdrawal operations of the control member, such an erroneous operation as that a reversing operation is done simultaneously with the advancement of the control member is certainly prevented. Also, the operation start and termination with the above-described intermittent gear is definitely and easily timed as compared with their counterparts utilizing clutch changeover or idler engagement and disengagement; therefore, the performance is stable, and there is little possibility of the occurrence of erroneous operation. Besides, because the introduction for engagement of the intermittent gear and driving gear is done by utilizing the pressure-contacting force of the active member against the cam portion, no special engaging initiation mechanism needs to be provided, and simplification and size reduction of the mechanism and reduction of its manufacturing costs are provided in this respect as well. For the operation levers for fast forwarding and rewinding, since the control locking member is provided with both a release cam portion and a locking portion opposed to the engaging portion of the operation lever, the locked state of either operation lever to which the lock has previously been applied is first released before the operating state of the newly selected operation lever is appropriately locked, all within one stroke. Because an operating portion for the idler control member which operates the idler for fast forwarding and rewinding is formed on the aforementioned operation levers, and a receiving portion for resetting the member to the neutral state in the condition that the operation levers are reset is formed on the member, all the operations necessary for fast forwarding or rewinding can smoothly be realized simply by means of a single lever operation, resulting in simplification of the mechanism. From any one of the above, a lightly and smoothly operable tape recorder can be offered at reduced costs. Still further, in case of an embodiment according to the present invention with which fast forwarding and rewinding are provided by engaging an idler with and disengaging it from the first and second reel bases, the idler control member to be operated by the operation lever for effecting fast forwarding or rewinding is provided between the reel bases, and the idler engaging and disengaging changeover operations are conducted via the member; therefore, no particularly powerful spring needs to be provided for biasing the idler, and the operations are effected lightly and easily. Still further, the member is provided with a receiving portion for regulating the operation lever to an intermediate position by touching the operating portion of the operation lever when the operation lever moves back; therefore, the member is automatically moved back to the neutral position by means of the active force of the spring used for resetting the fast-forwarding and rewinding operation levers. In other words, no spring for moving back the idler control member is necessary, and yet a balanced resetting action is provided as the operation levers 31 and 32 are provided on both sides, there being the merit of the reset state being very stable. In addition, no complex arrangement of many springs and the members for providing the spring force are necessary; therefore, the tape player can be reduced in dimensions and simplified in construction, making the present invention industrially very beneficial.

As shown in FIG. 21, the present invention may be embodied either with a single flywheel or with two flywheels (FIG. 1) provided in parallel each other; therefore, the present invention is applicable to a wide variety of models and is therefore very effective.

Because the aforementioned initiation of engagement of the intermittent gear and driving gear is provided by utilizing the pressure-contacting force of the cam portion of the active member, no special engaging mechanism needs to be provided, resulting in mechanism simplification, thinness and low manufacturing costs from this point of view as well. Since a control member to control the tape transport mechanism directly or indirectly and to normally energize the tape transport mechanism in the releasing direction is used, and a stopping means to let the control member interlock with the aforementioned active member and to place the tape transport mechanism in an active state against the energizing force and lock the mechanism to that state is provided, the head shifting operation is conducted very lightly and easily by means of the mechanism which is simple and thin as described before. Especially, in the case of employing a system that uses a plunger as the stopping means, when its electric power supply is turned off from the outside in such a manner as, for example, turning off an automotive engine key switch, holding of the plunger is released automatically to free the pinch roller, head, idler, etc., preventing them from being deformed and therefore keeping the performance from being deteriorated.

In an embodiment according to the present invention, the stepped portion of the cam portion which is formed integrally with the intermittent gear is formed so as to intermediately stop the engaging piece of the active member for thereby dividing at the stopping position the stroke of the action of the active member on the stepped portion so that the drive of the control member, the engaging of the intermittent gear to the driving gear and the action for releasing the fast-forwarding or rewinding state from being locked may be done in sequence; therefore, a single cam portion can cause various actions of a tape recorder of this kind to take place appropriately and orderly, and these actions being concentratedly provided allow the mechanism to be compact. Also, since the active portion provided on the active member is opposed to the projection formed on the member for locking the fast-fowarding and rewinding lever so that the active portion may be touched to the projection when the active member acts for introducing the intermittent gear for engagement with the driving gear, the mechanism can be made more compact from this point of view as well. Further, because a plunger is used with the means to lock the control member, and the sensing member interlocking by means of a fast-forwarding or rewinding operation is provided with an operating portion formed for operating the switch which is provided for turning off the electric power supply to the above-mentioned electromagnetic plunger, turning off the electric power supply releases the control member from being locked and resets the pinch roller, idler, etc. from the pressure-contacted state, preventing them from being deformed, which is especially effective in case that it is adopted for vehicle-mounted use, as the deformation prevention as described above can be provided by such an unconscious operation as an engine key switch operation.

We claim:

1. A tape player, comprising:
   a prime mover;
   a rotatably supported driving gear which is rotatably driven by said prime mover;
   a rotatably supported intermittent gear having teeth which can engage and be driven by teeth on said driving gear, a portion of said teeth of said intermittent gear being cut off in order to interrupt operative engagement of said intermittent gear with said driving gear;
   a cam formed integrally on said intermittent gear;
   a movably supported active member having a cam follower which operatively engages said cam, said cam follower moving said active member in response to rotation of said intermittent gear and said cam;
   a control member supported for movement between first and second positions, wehrein when said control member is in said second position, said tape player is in a tape playing mode and effects movement of a tape in a selected one of first and second directions which are opposite to each other;
   means responsive to movement of said active member for effecting movement of said control member from said first to said second position thereof;
   a movably supported changeover member and means responsive to movement of said changeover member for reversing the direction of movement of a tape when said tape player is in said tape playing mode;
   means for releasably coupling said changeover member and said active member so that movement of said active member effects movement of said changeover member; and
   releasing means for releasing said coupling of said changeover member and said active member when said control member is in its first position.

2. The tape player according to claim 1, including resilient means yieldably urging movement of said active member in a direction corresponding to movement of said cam follower into engagement with said cam; wherein said cam has a stepped portion which said cam follower engages when said cut-off portion of said teeth of said intermittent gear is aligned with said driving gear, said resilient means causing said cam follower to urge rotation of said intermittent gear toward a position in which said teeth thereof operatively engage said driving gear; and including a locking member which is movable to and from a locking position in which it engages and prevents rotation of said intermittent gear.

3. The tape player according to claim 2, including means for moving said locking member away from said locking position so as to permit rotation of said intermittent gear.

4. The tape player according to claim 1, including:
   rotatably supported first and second reel bases;
   first and second operation levers supported for movement between first and second positions, wherein when said first and second operation levers are in their second positions said tape player is respectively placed in fast forward and rewind modes, and wherein each said operation lever has an engaging portion formed thereon;
   resilient means yieldably urging each said operation lever toward its first position;
   control locking means cooperable with said engaging portion of each said operation lever for releasably locking such lever in its second position, said control locking means including means for releasing one of said operation levers which is releasably held thereby as the other of said operation levers is moved to its second position;
   a rotatably supported idler movable from an initial position to first and second positions in which it respectively drivingly engages said first and second reel bases;
   means for rotationally driving said idler when it is in its first and second positions so as to respectively effect fast forward and rewind movement of a tape;
   a movably supported idler control member and means for effecting movement of said idler between its initial position and its first and second positions in response to movement of said idler control member;
   first cooperating means on said first operation lever and said idler control member for effecting movement of said idler control member between two positions in which said idler is respectively in its initial and first positions when said first operation lever is respectively in its first and second positions; and
   first cooperating means on said second operation lever and said idler control member for effecting movement of said idler control member between two positions in which said idler is respectively in its initial and second positions when said second operation lever is respectively in its first and second positions.

5. The tape player according to claim 4, wherein said means for rotationally driving said idler includes flywheel means rotatably driven by said prime mover and drivingly coupled to said idler when said idler is in its first and second positions; and
   wherein said idler control member is provided approximately between said reel bases.

6. The tape player according to claim 5, wherein said means for effecting movement of said idler in response to movement of said idler control member includes a movably supported interlocking member which is operatively coupled to said idler control member by a resilient member and which has said idler rotatably supported thereon.

7. The tape player according to claim 1, wherein said means responsive to movement of said changeover member includes a changeover cam supported for movement between first and second positions and adapted to be operatively engaged by said changeover member, movement of said changeover member by said active member causing said changeover member to engage and move said changeover cam from one of its first and second positions to the other thereof, wherein when said tape player is in said tape playing mode a tape is moved in said first direction when said changeover cam is in its first position and in said second direction when said changeover cam is in its second position.

8. The tape player according to claim 7, including resilient means yieldably urging said active member in a direction of movement thereof corresponding to movement of said cam follower toward said cam; wherein said releasable coupling means includes said active member having a slot therein, said slot having a first portion which extends approximately parallel to said direction of movement of said active member and having a second portion at one end of said first portion which extends approximately perpendicular to said direction of movement of said active member; wherein said releasable coupling means includes said changeover member moving in directions approximately parallel to said direction of movement of said active member and having a pin which is slidably received in said slot in said active member; wherein said releasable coupling means includes resilient means cooperable with said changeover member for yieldably urging it in a direction causing said pin thereon to move into said second portion of said slot when aligned therewith; and wherein said releasing means includes said control member having a portion which, when said control member is in said first position, is positioned so as to engage said pin on said changeover member and prevent said pin from entering said second portion of said slot.

9. The tape player according to claim 8, wherein said movement of said changeover cam is pivotal movement, wherein said changeover cam has means defining a V-shaped cam surface thereon, and wherein said changeover member has a further pin thereon which can slidably engage said V-shaped cam surface on said changeover cam.

* * * * *

UNITED STATES PATENT AND TRADEMARK OFFICE
CERTIFICATE OF CORRECTION

PATENT NO. : 4 581 665
DATED : April 8, 1986
INVENTOR(S) : Yukio ITO et al

It is certified that error appears in the above-identified patent and that said Letters Patent is hereby corrected as shown below:

Column 14, line 48; change "first" to ---second---.

Signed and Sealed this

Nineteenth Day of August 1986

[SEAL]

Attest:

DONALD J. QUIGG

Attesting Officer        Commissioner of Patents and Trademarks